United States Patent

[11] 3,550,512

[72] Inventor Karl Heinz Lange
 Buende-Ennigloh, Germany
[21] Appl. No. 675,816
[22] Filed Oct. 17, 1967
[45] Patented Dec. 29, 1970
[73] Assignee Balda-Werke, Photographische Gerate und Kunststoff R. Gruter KG
 Bunde (Westphalia), Germany
 a company of Germany
[32] Priority Oct. 21, 1966
[33] Germany
[31] No. B89501

[54] PHOTOGRAPHIC CAMERAS
 3 Claims, 7 Drawing Figs.
[52] U.S. Cl. ............................................... 95/11, 95/31
[51] Int. Cl. ............................................... G03b 17/00, G03b 19/04
[50] Field of Search .................................... 95/11, 34(roll), 31; 240/152, 2SP

[56] References Cited
UNITED STATES PATENTS
| 1,944,312 | 1/1934 | Black | 95/31 |
| 2,428,167 | 9/1947 | Linton | 240/2SP |
| 3,396,269 | 8/1968 | Sorenson | 240/152 |
| 698,173 | 4/1902 | Bornmann | 95/34 |
| 2,554,333 | 5/1951 | Kaplowitz | 95/11(X) |
| 2,931,282 | 4/1960 | Owens | 95/11(X) |

FOREIGN PATENTS
| 654,139 | 6/1936 | Germany | 95/31 |

Primary Examiner—John M. Horan
Assistant Examiner—Robert F. Greiner
Attorney—Sparrow and Sparrow ABSTRACT: A hinged opening back or rear cover for a rollfilm camera having a rectangular film viewing window, made of resilient plastic material, secured in a rectangular aperture in the cover, by mating tongue and groove portions formed along the window and aperture edges. The window member has spring finger members formed integrally therewith. These spring members serve both as film pressure springs and to provide initial opening of the camera back when it is unlocked. Auxiliary opening spring members are associated with the cover hinges.

PATENTED DEC 29 1970

3,550,512

INVENTOR:
Karl Heinz Lange
By
Sparrow and Sparrow
Attorneys

PHOTOGRAPHIC CAMERAS

BACKGROUND OF THE INVENTION

This invention relates to photographic cameras and particularly to rear covers, that is opening backs, for roll-film cameras. It is known to provide roll-film cameras with a rear cover having a viewing window for indicating the advancement of the film, and with springs, which are secured near the viewing window. The springs serve both to apply marginal pressure to the film and to provide initial opening of the camera back or cover when it is unlocked.

In one known arrangement, a viewing disc is clamped between two plates which together form the rear cover, which has a double wall in this case. Similarly, the pressure springs are secured between the said plates. Such a cover formation is complicated and expensive, however.

SUMMARY OF THE INVENTION

Accordingly, the present invention provides a rear cover or opening back for a roll-film camera having an aperture in which is secured a film viewing window made of a transparent resilient plastic material, the said viewing window having film pressure spring members formed integrally therewith.

Preferably, the viewing window is secured in the cover aperture by mating tongue and groove portions formed in the mutually engaging edges of the aperture and window.

In a preferred form of the invention, the aperture and viewing window are rectangular and the tongue portions, formed along the aperture longitudinal edges, do not extend the whole length thereof.

It is therefore one object of the present invention to provide a roll-film camera opening back or cover, with a transparent viewing window, of simplified construction.

Another object of the present invention is to provide a viewing window of resilient plastic material which is formed integrally with spring members.

Another object of the present invention is to provide a hinged camera back or cover with improved spring means for providing the initial opening thereof, when the cover is unlocked.

Still other objects will be evident from the description of the preferred embodiment of the invention which follows.

Accordingly, the present invention comprises the features of construction, combination of elements and arrangement of parts, which will be exemplified in the construction hereinafter set forth. The scope of the invention is defined by the appended claims.

BRIEF DESCRIPTION OF DRAWINGS

For a fuller understanding of the nature and objects of the present invention, reference should be had to the following detailed description taken in connection with the accompanying drawings, in which.

DESCRIPTION OF THE PREFERRED EMBODIMENT

Figure 4:
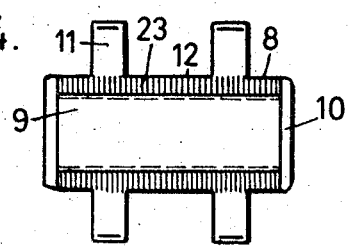
FIG. 4 is a plan view of the viewing window with attached springs.
Figure 5:
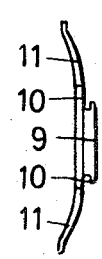
FIG. 5 is a section view of the viewing window of FIG. 4.
Figure 6:
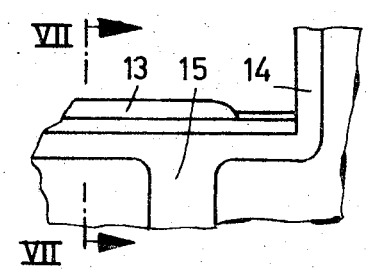
FIG. 6 is a magnified view of a corner of the cover window opening.
Figure 7:
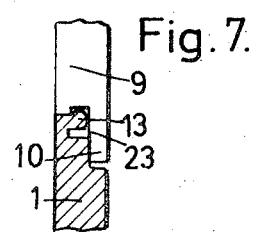
FIG. 7 is a cross section taken on the line VII–VII of FIG. 6.

In the FIGS., a camera rear cover or opening back 1, of plastic material, is provided with two swivel eyelets 2 and 3 and a locking slide 4 capable of engaging with a fixed member (not shown). The cover 1 has an aperture 5 for the passage of the film feed sprocket or roller (not shown) and another aperture 6 for the view finder. A rectangular opening 7 in the cover 1 receives a viewing window 8, mounted from inside. The window 8 is made of transparent resilient plastic material having a thick center plate 9 on which a stepped edge 10 is formed and, above the latter, four slightly curved spring portions 11. Along each of the longitudinal edges of the plate 9, a recessed groove 12 (FIG. 4) is formed in which a beaded edge 13 (FIG. 6) can engage. The portion 13 is molded to project inwardly along the longitudinal edges of the opening 7 of the plastic cover 1 so that it engages resiliently with the viewing window 8 (see FIGS. 6 and 7). As shown in the view of FIG. 6, the beaded edge 13 does not extend the whole length of the longitudinal edge of the opening 7. Recesses 14 and 15 are associated in the cover 1 with the edge 10 and the springs 11 in which they are disposed in the position of use.

Figure 1:
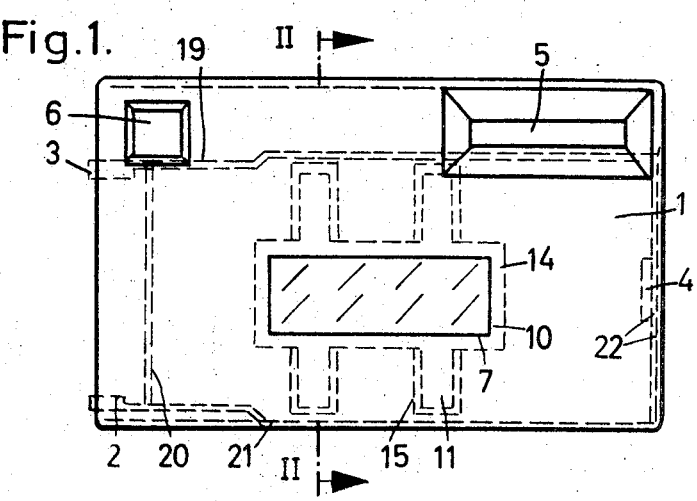
FIG. 1 is the outer view of a camera rear cover or opening back according to the invention.
Figure 2:
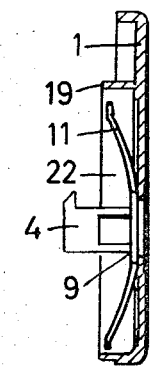
FIG. 2 is a cross section taken on the line II–II of FIG. 1.
Figure 3:
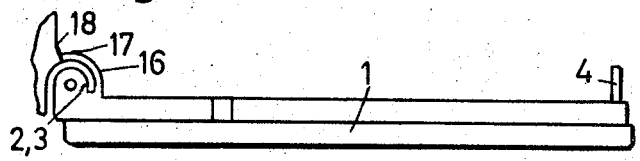
FIG. 3 is a side view of the cover according to FIG. 1.

In order to provide initial opening of the cover, when the locking slide 4 is released, a peripheral spring 16 is formed on each of the swivel eyelets 2, 3. This spring 16 is resiliently in contact with a stop 18 on the housing by its free end 17 in the closed position (FIG. 3). As soon as the locking slide 4 is released, the cover 1 is partially opened by the spring 16, even when a film is not inserted.

Auxiliary walls 19, 20, 21 and 22, which are adapted to the outline of the film roll (not shown), ensure a lightproof attachment or the screening of dispersed light.

The edge 10 of the viewing window 8 has a matte surface on the longitudinal side, which serves to define clearly the field of vision and cover the bead edges 13 of the cover.

I claim:

1. An apertured rear cover for a film camera comprising a viewing window secured in the cover aperture substantially flat in the plane thereof, locking means for securing said cover to said film camera body and spring loading means extending laterally substantially in a flat manner in continuation of the inner surface of said window for applying pressure to the film in said film camera and for partially opening said cover by hinged movement thereof upon releasing of said backing means, said viewing window in said rear cover consisting of transparent resilient plastic material and said spring loading means formed homogeneously with said window.

2. An apertured rear cover according to claim 1, further comprising a rectangular aperture and a corresponding rectangular viewing window, said viewing window having a thickness being a multiple of the thickness of said spring means, stepped edges on said viewing window, said edges constituting a margin flange projecting from the periphery of said window at the inner surface thereof, laterally open mating grooves on said edges of said viewing window, said grooves disposed for receiving tongue portions formed at least along the longitudinal inner aperture edges for securing said window in said aperture, one side of said grooves being formed by said margin flange, said aperture having a recess surrounding the same, said spring loading means having the same thickness as said margin flange, said spring means projecting from said flange, said flange engaging said recess, and said margin flange having a matte surface for rendering said tongue portions engaging said mating grooves.

3. An apertured rear cover according to claim 2 including hinge means at one end thereof, said hinge means comprising hinge eyes, auxiliary spring means formed integrally and homogeneously in one piece with said hinge eyes, said auxiliary spring means abutting against the body part of said camera for assisting the effect of said spring loading means of said viewing window with regard to opening partially said rear cover when said locking means is released without increasing the pressure to the film.